(12) United States Patent
Wolfe

(10) Patent No.: US 7,821,150 B2
(45) Date of Patent: Oct. 26, 2010

(54) OCEAN ENERGY HARVESTING SYSTEM

(75) Inventor: Douglas E Wolfe, 9819 Brightlea Dr., Vienna, VA (US) 22181

(73) Assignee: Douglas E Wolfe, Vienna, VA (US)

(*) Notice: Subject to any disclaimer, the term of this patent is extended or adjusted under 35 U.S.C. 154(b) by 721 days.

(21) Appl. No.: 11/653,224

(22) Filed: Jan. 16, 2007

(65) Prior Publication Data
US 2007/0164569 A1    Jul. 19, 2007

Related U.S. Application Data

(60) Provisional application No. 60/758,972, filed on Jan. 17, 2006.

(51) Int. Cl.
*F03B 13/00* (2006.01)

(52) U.S. Cl. .............................. 290/53; 290/43; 290/42; 290/54

(58) Field of Classification Search ................... 290/53, 290/43, 42, 54
See application file for complete search history.

(56) References Cited

U.S. PATENT DOCUMENTS

| | | | | | |
|---|---|---|---|---|---|
| 4,781,023 | A | * | 11/1988 | Gordon | 60/506 |
| 6,392,314 | B1 | * | 5/2002 | Dick | 290/53 |
| 6,531,788 | B2 | * | 3/2003 | Robson | 290/43 |
| 6,812,588 | B1 | * | 11/2004 | Zadig | 290/53 |

* cited by examiner

*Primary Examiner*—T C Patel
*Assistant Examiner*—Iraj A Mohandesi

(57) ABSTRACT

An ocean energy harvesting system utilizes horizontal structural members that rotate in response to wave motion. The structural members are designed to capture energy in a line array that replicates the shape of the waves as they pass through the ocean. A generator platform is placed in the ocean environment or on the shore, and the structural members rotate under the platform or around a pivot post placed in proximity to the platform. The rotation drives a generator shaft due to direct attachment to the structural member or from a cable attached to a structural member some distance from the platform. The structural members can be of substantial length depending on the prevailing wave conditions at the site and the desired amount of energy capture. The system adjusts to differing water levels due to tidal shifts.

14 Claims, 2 Drawing Sheets

OCEAN ENERGY HARVESTING SYSTEM

This application claims the benefit under 35 U.S.C. 119(e) of U.S. provisional patent application No. 60/758,972, filed Jan. 17, 2006 and entitled Ocean energy harvesting system, the specification of which is hereby incorporated by reference in its entirety.

BACKGROUND

1. Field of Invention

This invention relates, in general, to an apparatus for capturing and extracting renewable energy, and in particular, to an apparatus for extracting ocean wave and current energy and converting it into electricity, hydrogen, or other useful form of energy.

2. Description of Prior Art

Various types of wave energy capture concepts have been proposed in the prior art. Many of these have been tested and some operated at sea, but none have resulted in large scale, cost-effective wave energy capture and hence lack commercial viability. The shortfalls of prior concepts consistently fall into several categories; they are point absorbers and capture a small amount of energy, they rely primarily on the rise and fall of the waves and miss the horizontal energy component of the waves and current, they do not effectively account for tidal motion, they place precision generating equipment in the corrosive salt water environment, their complexity drives large installation and operating costs, and they are vulnerable to severe weather. These factors combine to render proposed systems inefficient in the capture of wave energy. The present invention resolves the problematic issues in prior art and represents significant advancements.

Specifically as applied to the prior art, U.S. Pat. No. 3,828,557 discloses a device that captures energy from the pushing action of the waves. This is a point absorber, does not optimally adjust with the tidal shifts, and captures energy only from the incoming action of the wave.

U.S. Pat. No. 4,514,644 discloses a pumping unit driven by a horizontal boom. The boom is connected to a pump that subsequently drives a generator. Energy is lost repositioning the boom, the unit does not adjust for tidal shifts, and the conversion device requires pumped intermediate energy storage.

U.S. Pat. No. 4,560,884 discloses a float attached to an arm on the underneath side of a platform that drives a piston. This design is a point absorber requiring a large number of devices for substantial energy capture, relies primarily on the rise and fall of the waves, does not adjust efficiently to tidal shifts, and requires intermediate energy storage.

U.S. Pat. No. 4,754,157 discloses a cylinder and a rod extending out of the cylinder connected to a float. The action of the wave on the float drives a generator. This approach is a point absorber, limited to energy capture in one relatively small location, and requiring many such devices to be installed to generate substantial energy. The generating equipment is in the salt water, there is no adjustment for tidal shift, and the primary means of energy capture is the rise and fall of the waves.

U.S. Pat. No. 4,931,662 discloses a device consisting of a rigid beam with a float on one end; the motion of the waves drives the beam and pumps a fluid. The float moves in a vertical direction, capturing only the rise and fall of the waves. The design is a point absorber, requiring a large number of similar devices to capture substantial energy, and there is no mechanism to account for tidal shift.

U.S. Pat. No. 5,094,595 discloses a machine embedded on the ocean floor and using multistage axial flow piston compressors to pump a fluid and ultimately drive a generator. This design is a point absorber, places precision equipment under the ocean, requires intermediate pumped storage of energy, and is vulnerable to severe weather.

My own patent, U.S. Pat. No. 5,708,305 also represents another type of point absorber. While the paddles are placed on a horizontal boom, energy is captured at only one point and ocean testing has shown that the disclosed configuration will drive the paddles to float to the very top of the wave and thereby miss most of the available energy. The system requires intermediate pumped storage and a multi-tiered structure that will be costly and vulnerable to severe weather. The means for adjusting for tidal shift reduces the overall efficiency of the system at lower water levels.

U.S. Pat. No. 5,808,368 discloses a float that is attached to pivoting device mounted on a submerged anchor. The float represents a point absorber and is dependent on the vertical action of the waves to actuate the system. The design will miss substantial amounts of available energy and does not appear to optimally adjust for tidal variations.

U.S. Pat. No. 6,756,695 discloses a float with excessive buoyancy that drives a turbine. Here again, this is a point absorber requiring many devices and places a turbine in the saltwater environment. The system depends on the vertical rise and falls of the waves and misses much of the horizontal energy.

Foreign patent Japan Pat. No. 58-91372 discloses a device suspend on a vertical arm that moves back and forth in the water. This is a point absorber, not designed to the shape of the waves, and will require many devices to capture a large amount of energy. Rotation of the arm will cause the device to rise up out of the water and while offering a means to return to the original position, it will miss a substantial amount of energy as the arm elevates.

As demonstrated by the above references, known devices suffer from similar problematic issues. Ocean waves represent a very attractive renewable energy resource; however, the waves present an unpredictable, asynchronous source that has resulted in the limited utility and application of existing concepts. Prior designs were not optimized for the shape of the waves as they pass through the ocean. The present invention has been demonstrated and has been shown to resolve the problematic issues in other concepts, and therefore advances the state-of-the-art well beyond any existing devices.

SUMMARY OF THE INVENTION

The present invention has been refined through testing in the ocean and offers a harvesting device shaped for the energy in the waves. The following description will make clear that it overcomes the problematic issues plaguing prior designs. The present invention consists of two primary elements, a wave energy capture element that is placed in the water and an energy transformation element that converts the force of the energy captured into electricity. The energy capture element consists of means to position a horizontal structural member such that it will rotate in response to the force of the waves and current. Energy is transferred from the rotating structural members by a direct drive shaft or by using cables that connect to the energy conversion element to drive the generator. The energy conversion element is housed in a generator platform and converts the force into rotational motion that can be directly converted to electricity. The generator platform is designed to withstand the prevailing weather conditions known at that site, and protect the precision rotating equipment, thereby creating a reliable, available and maintainable system. The following are objects of the present invention:

It is an object of the present invention to capture ocean energy in a line array tailored to the shape of the incoming waves.

It is an object of the present invention to utilize the natural circular motion of the water particles to actuate a line array and then reposition the array for the next wave.

It is an object of the present invention to convert the momentum of ocean waves and currents moving primarily in a plane horizontal to the surface of the ocean into useful forms of energy.

It is an object of the present invention to develop a renewable source that operates continuously over a 24 hr. period and through all seasons of the year.

It is an object of the present invention to effectively capture energy whether near the shore or offshore.

It is an object of the present invention to capture wave energy while precision generators remain in a protected environment either onshore or above the surface of the ocean.

It is an object of the present invention to be adaptable to varying incoming wave directions, efficiently capturing energy over a wide range of wave conditions.

It is an object of the present invention to develop a renewable energy source that can capture available renewable energy close to large centers of population.

It is an object of the present invention to adjust to tidal shift and be equally efficient at high or low tides.

It is an object of the present invention to capture the incoming, outgoing, and current energy available in the ocean.

It is an object of the present invention to capture wave energy over a wide range of incoming and outgoing variable directions presented by changing ocean conditions.

It is an object of the present invention to operate efficiently both in near shore or offshore locations depending on energy availability and desired performance.

It is an object of the present invention to capture the energy of the ocean waves in a means that is able to withstand severe storms.

It is an object of the present invention to be able to construct most of the components away from the ocean and then require minimal time and cost to deploy and maintain the system in the ocean.

It is an object of the present invention to utilize primarily available technology in industries such as the offshore marine or wind power industries. As these technologies improve, it is an object of the present invention to be modular and easily integrate upgrades to improve system performance.

It is an object of the present invention to dramatically increase energy capture efficiency such that the system is useful in a wide range of wave environments and is competitive with other forms of energy generation.

It is an object of the present invention to minimize environmental impacts including risk to fish or wildlife, damage to the ocean floor, and aesthetic changes to the beach and waterfront.

These and other advantages of the present invention will be fully apparent from the following description and drawings.

LIST OF REFERENCE NUMERALS

Figure 1:
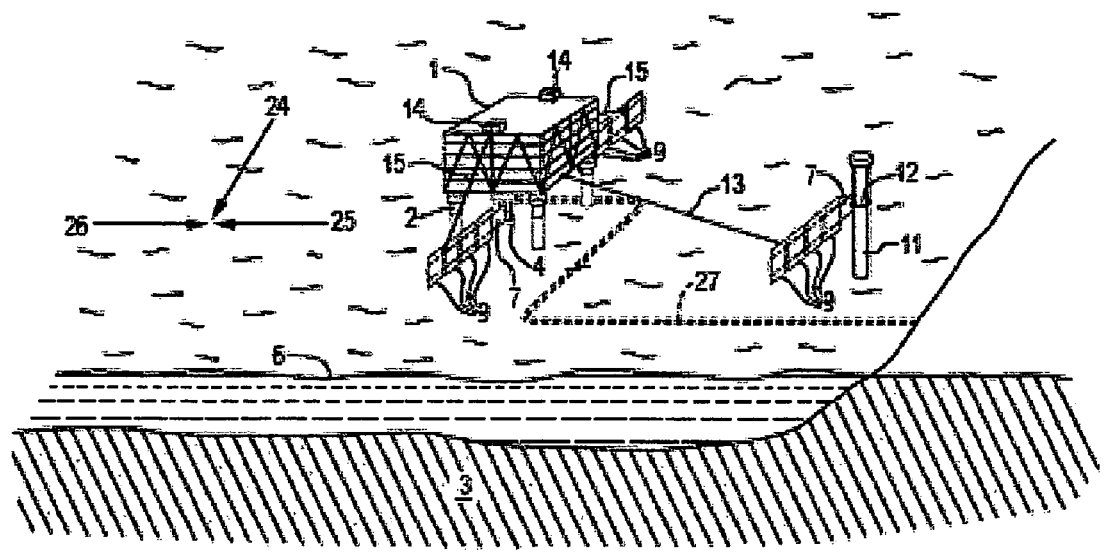
FIG. 1 is a perspective view of the present invention showing the generator platform and the horizontally rotating structural members.

1. Generator Platform
2. Generator Platform Supports
3. Ocean Floor
4. Rotational Shaft
5. Rotational Shaft Bearings
6. Water level
7. Structural Member
8. Clevis Pin
9. Momentum Absorbers
10. Flotation Material
11. Pivot Post
12. Retaining cable
13. Transfer cable
14. Winch
15. Winch Cable
16. 45 degree bearing
17. Ratcheting 45 degree bearing
18. Ratcheting pulley
19. Pulley return
20. Generator Shaft
21. Flywheel
22. Variable Speed Generator
23. Gearbox
24. Current
25. Wave backflow
26. Incoming waves
27. Power transmission line

DESCRIPTION OF THE PREFERRED EMBODIMENT

Referring now to the drawings in greater detail, FIG. 1 shows the wave energy harvesting system of the present invention that involves placing a generator platform 1 near or above the ocean environment using generator platform supports 2 that are either embedded or anchored to the ocean floor 3. The generator platform 1 has a rotational shaft 4 mounted inside using rotational shaft bearings 5. The rotational shaft 4 extends below the floor of the generator platform 1 and down below the water level 6 at low tide. Attached to the rotational shafts 4 are structural members 7 that extend from underneath the generator platform 1 a significant distance into the ocean wave environment. Momentum absorbers 9 are attached to the structural members 7 and create a large cross-section for harvesting wave and current energy. Flotation material 10 is embedded inside the structural members 7 to keep the structural members floating on the water level 6, with the momentum absorbers 9 extending down below the water level. FIG. 1 also shows a pivot post 11 embedded in the ocean floor around which a structural member 7 can rotate. The structural member 7 rotating around the pivot post 11 is held in place by a retaining cable 12, and energy is transferred into the generator platform 1 using a transfer cable 13. For structural members 7 underneath the generator platform 1, a winch 13 is positioned on the generator platform 1 with its cable 14 attached to the structural member.

Figure 2:
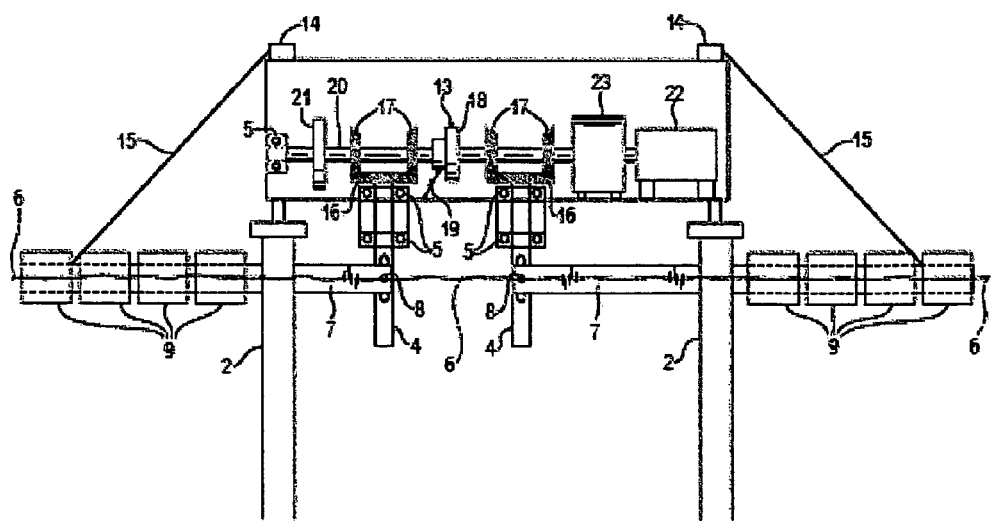
FIG. 2 shows a horizontal cross section of the structural member and the attached momentum absorbers, the rotational shaft, and the generator housed inside the platform.

FIG. 2 shows a side view of the rotational shafts 4 mounted on the shaft bearings 5 inside the generator platform 1. The rotational shaft 4 extends below the generator platform 1 and is slotted to allow the clevis pin 8 to move up and down with the water level 6. The structural member 7 attaches to the clevis pin 8. Attached to the structural member 7 are momentum absorbers 9 with their major cross-section oriented toward the incoming wave 26 and the backflow of the water 25 as the wave passes through. Inside the generator platform 1, a 45-degree 16 bearing is attached to the rotational shaft 4. The 45-degree bearings 16 drive ratcheting 45-degree bearings 17 that are attached to the generator shaft 20. Incoming waves 26 will also strike the structural member 7 rotating about the pivot post 11. The generator shaft 20 supports a flywheel 21 and drives a gearbox 23 and a variable speed generator 22. From the generator 22, power transmission lines 27 transfer the electricity to the shore for use.

Figure 3:
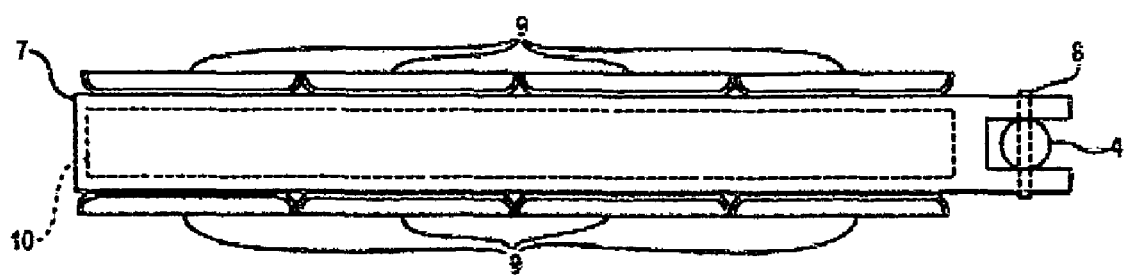
FIG. 3 is a vertical cross section of the structural member showing the attachment to the rotational shaft, the mounting of the momentum absorbers, and the flotation material inside the structural member.

FIG. 3 shows a vertical view of the structural member 7 underneath the generator platform 1 and the momentum absorbers 9. The structural member 7 is shaped to attach to the clevis pin 8. The clevis pin 8 attachments allow the structural member 7 to rotate in a vertical plane without turning the rotational shaft 4. The momentum absorbers 9 are shaped to be efficient in harvesting energy from varied directions. Structural members 7 attached to the pivot post 11 are positioned using the retaining cable 12 as shown in FIG. 1.

In use, the generator platform 1 is placed at offshore locations with wave energy. The structural members 7 will turn the rotational shaft 4 as incoming waves 26 strike the momentum absorbers 9. Turning the rotational shaft 4 in either direction causes the attached 45-degree bearings 16 to turn the ratcheting 45-degree bearings 17. The ratcheting 45-degree bearings 17 will drive the generator shaft 20 in one direction, turning the flywheel 21 and the variable speed generator 22. The ratcheting bearings 17 will perform such that for each rotation of the structural arm 7, one bearing will drive the generator shaft 20 and one bearing will ratchet back. The back and forth motion of the structural members 7 will always drive the rotational shaft 4, thereby harvesting energy during motion in either direction. The winches 14 are used to raise and lower the structural members 7 for installation, maintenance, and to remove the structural members 7 from the ocean during severe weather. The structural member 7 acting as a heaving line array can be allowed to freewheel around pivot post 11 if incoming waves 26 are of dangerous magnitude. The structural member 7 rotating around the pivot post 11 by incoming waves 26 will also drive the generator shaft 20. The configuration of the structural member 7 allows it to capture wave energy more as a heaving line array as opposed to heaving buoy point absorbers shown in other art. As the waves 26 move toward the shore, the transfer cable 13 will pull on a ratcheting pulley 18 that will drive the generator shaft. As the backflow of the wave 25 moves the structural member 7 out toward the ocean, a pulley return 19 will rewind the ratcheting pulley 18, maintaining tension in the transfer cable 13, and position it for the next incoming wave 26. Electricity from the variable speed generator 22 will be transferred onshore and to the grid using power transmission lines 27.

Incoming waves 26 will drive the structural members 7 toward the shore. The structural members 7 underneath the generator platform 1 will be restrained in their motion by the generator platform supports 2. The length of the winch cable 15 can also be adjusted such that a slight lifting motion is imparted to the structural members 7 as they move toward the generator platform supports 2. As the wave energy passes through, the natural orbital backflow 25 of the water will move the structural members 7 out again toward the open ocean. The rotational shaft 4 is configured such that the structural members 7 can adjust to differing water levels 6. The structural members 7 are designed to float on the water with approximately half the surface area of the momentum absorbers 9 extending below the water level 6 and the upper half impacted by the incoming wave 26. This configuration minimizes twisting or rotation about the long axis of the structural members 7. The momentum absorbers 9 can be of different shapes to harvest wave energy as the direction of the incoming waves 26 changes.

The manufacture of the system is envisioned take place on shore some distance away from the point of use. The generator platform 1 can be towed to the operating location and the generator platform supports 2 operated and anchored much like an oil platform, or the generator platform supports 2 can be embedded in the ocean floor. The pivot post 11 can be embedded in the ocean floor or anchored on a platform that maintains a relatively fixed position. During towing or severe storms, the structural members 7 below the generator platform 1 are elevated above the water level 6 using the winches 14.

Although the ocean wave energy harvesting system and the method of using the same according to the present invention has been described in the foregoing specification in considerable details, it is understood that modifications may be made to the invention that do not exceed the scope of the appended claims, and modified forms of the present invention done by others skilled in the art to which this invention pertains will be considered infringements of this invention when those modified forms fall within the claimed scope of this invention. For example, other configurations of the structural members may be envisioned that would change the means of flotation, the elements and their shape for capturing the wave and current momentum. Lines could be attached to the structural members at various points, including a configuration where the structural members were in the ocean and the generator platform was positioned on the shore. The pivot point may be established by a post anchored to the ocean floor or by a floating platform upon which multiple pivot points supporting multiple members may be established. Individual structural members could each drive a generator or a number of configurations and gearing ratios could be developed to drive differing types of generators or energy storage devices. Energy could be stored in a pumped fluid prior to conversion to electricity. Energy produced could be used for desalination or the production of hydrogen. Amongst other things, adoption of these variations still relay on the basic fundamentals disclosed in the present invention.

What is claimed as my invention is:

1. An apparatus for converting the energy in water waves into another more useful form, comprising:
   a. at least one buoyant structure at or near the surface of a body of water, said structure reacting in a plane substantially parallel to the water's surface as caused by the forces of wave energy and further having at least one side with a cross-section designed to capture incident wave energy, including the circular motion of the water molecules, and actuate the buoyant structure in a substantially uniform manner throughout its length;
   b. a pivot point secured within a body of water in a substantially vertical position, the buoyant structure being securable to the pivot point so as to allow the structure to stay positioned near the water's surface along its length at the same general location and while rotating back and forth relative to the pivot point axis in an arc substantially parallel to the water's surface; and
   c. means to attach one or more drive elements to said buoyant structure for actuating a mechanism as a result of wave energy striking said buoyant structure.

2. The apparatus in claim 1 wherein the portion of said buoyant structure with large cross-section has sufficient mass to keep said buoyant structure from floating up on incident waves and maintain substantially uniform motion in an are about its length.

3. The apparatus in claim 1 wherein said buoyant structure is scalable to substantial length and cross-section to capture the horizontal energy of the wave front and maintain substantially uniform motion in an area about its length.

4. The apparatus in claim 1 wherein said buoyant structure is able to adjust its vertical position about said pivot point in response to differing water levels and still rotate in a horizontal are relative to the pivot point.

5. The apparatus in claim 1 wherein the mechanism is actuated as a result of the motion of multiple said buoyant structures rotating in a substantially uniform manner about multiple pivot points.

6. The apparatus in claim 1 wherein said pivot is used as a rotational shaft to rotate said mechanism based on uniform motion of said buoyant structure.

7. The apparatus in claim 1 wherein said mechanism is placed out of the water.

8. The apparatus in claim 1 wherein force transfer lines are attached to said buoyant structure at any point along its length and on either side of the pivot point.

9. The apparatus in claim 1 wherein the said mechanism is placed on the shore.

10. A method of extracting energy from water waves, comprising the steps of:
    a. securing a pivot point in a body of water;
    b. attaching a structure to the pivot point, said structure having buoyant side with a cross-sectional area that is larger than buoyant other side, said structure further being capable of rotating in a uniform manner in an arc substantially perpendicular to the pivot point;
    c. orienting the structure such that predominately horizontal wave energy strikes the side of the structure having the larger cross-sectional area;
    d. connecting said structure to a mechanical device capable of converting the motion of said structure to another form of energy; and
    f. attaching the mechanical device to a generator to create useful energy.

11. The method of claim 9 wherein said structure's cross-section is shaped to harvest wave energy throughout the circular motion of the water molecules.

12. The method of claim 9 wherein said structure adjusts its vertical level based on changes in the water level and maintains a relative rotation about the pivot point axis.

13. An energy harvesting system, comprising:
    a. a pivot point secured in a body of water in a substantially vertical and fixed position;
    b. a buoyant structure mounted to the pivot point so as to be capable of rotating in an arc substantially perpendicular to the pivot point, said buoyant structure having at least one side with a cross-sectional area exceeding that of other side of said buoyant structure, and said buoyant structure being positioned within the water body such that predominately horizontal wave energy strikes the side having the larger cross-sectional area;
    c. a mechanical device connected to the structure by a drive element, said device capable of converting energy to another form; and
    d. a generator connected to the mechanical device to allow for the creation of useful energy.

14. An ocean energy harvesting system comprising a means to:
    a. place in the ocean multiple buoyant structures capable of capturing horizontal wave energy;
    b. transfer the force created by incident waves on said buoyant structures acting in a substantially uniform manner rotating in a plane horizontal to the ocean about a substantially vertical pivot point to a shared mechanical device capable of transforming force to another energy form; and
    c. position said mechanical device substantially away from the ocean environment.

* * * * *